(12) United States Patent
Tong et al.

(10) Patent No.: US 8,510,477 B2
(45) Date of Patent: Aug. 13, 2013

(54) PROTOCOL RESOLUTION DEVICE AND METHOD EMPLOYING THE SAME

(75) Inventors: Song-Lin Tong, Shenzhen (CN); Ying-Bin Fu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 165 days.

(21) Appl. No.: 13/270,470

(22) Filed: Oct. 11, 2011

(65) Prior Publication Data

US 2012/0260000 A1   Oct. 11, 2012

(30) Foreign Application Priority Data

Apr. 11, 2011   (CN) .......................... 2011 1 0089167

(51) Int. Cl.
*G06F 3/00* (2006.01)
*G01R 31/08* (2006.01)

(52) U.S. Cl.
USPC ............................................. 710/5; 370/228

(58) Field of Classification Search
None
See application file for complete search history.

*Primary Examiner* — Hyun Nam
(74) *Attorney, Agent, or Firm* — Altis Law Group, Inc.

(57) ABSTRACT

A protocol resolution device electrically connected to a central processing unit (CPU) includes a signal controller to receive communication protocol from the CPU, a signal input module, and display module. The signal input module provides an electrical signal to the signal controller. The signal controller decodes the communication protocol from the CPU and stores the decoded communication protocol, the signal controller selectively accesses and calls up the decoded communication protocol according to the electrical signal, and transmits the decoded communication protocol to the display module for display.

20 Claims, 3 Drawing Sheets

PROTOCOL RESOLUTION DEVICE AND METHOD EMPLOYING THE SAME

BACKGROUND

1. Technical field

The disclosure generally relates to protocol resolution control, and particularly to a protocol resolution device and a method thereof for monitoring and decoding voltage identification digital (VID) communication protocol.

2. Description of the Related Art

In a voltage regulator platform, the central processing unit (CPU) of a computer usually includes a VID pin in electronic communication with a pulse width modulation (PWM) controller. Thus, the CPU can transmit an encoded VID communication protocol to the PWM controller through the VID pin in a serial manner to govern the PWM controller.

However, the serial communication protocol that is transmitted is unable to be monitored or resolved in real-time. Thus, when a communication abnormality between the CPU and the PWM controller occurs, it is difficult to determine whether it is the PWM controller or the communication which has failed, which causes inconvenience in testing and debugging the voltage regulator platform.

Therefore, there is room for improvement within the art.

BRIEF DESCRIPTION OF THE DRAWINGS

Many aspects of a protocol resolution device and a method employing the same can be better understood with reference to the following drawings. The components in the drawings are not necessarily drawn to scale, the emphasis instead being placed upon clearly illustrating the principles of the protocol resolution device and method employing the same. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
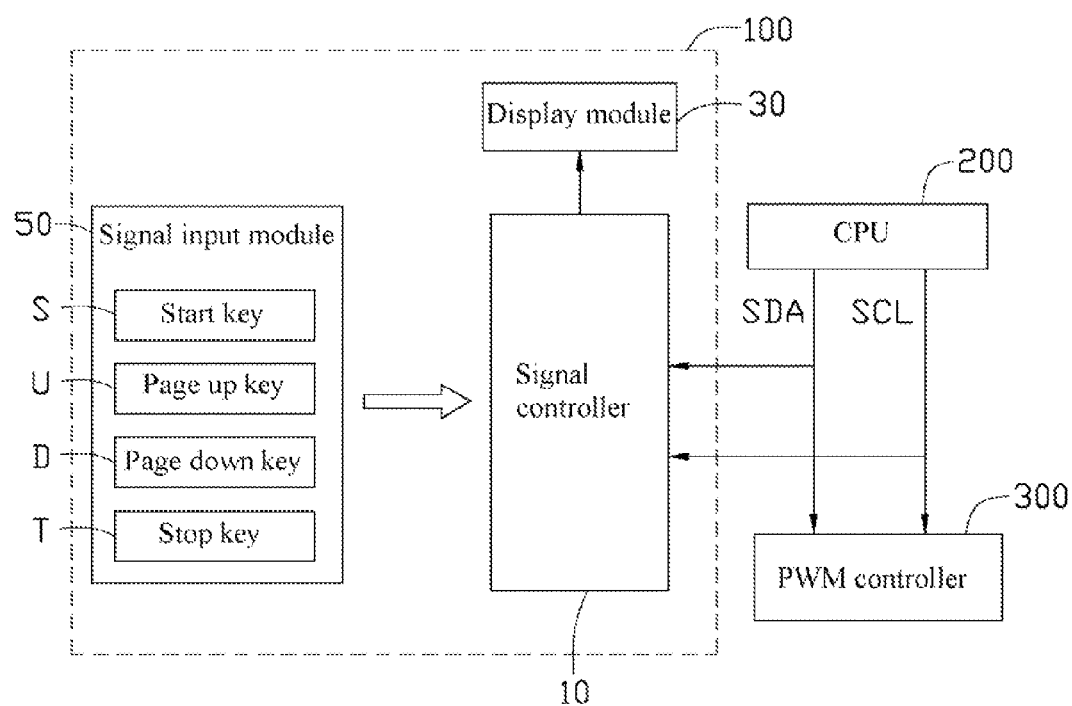
FIG. 1 is a block view of one embodiment of a protocol resolution device electrically connected to a central processing unit and a pulse width modulation controller of the disclosure.

FIG. 1 shows a block view of one embodiment of a protocol resolution device 100 electrically connected to a central processing unit (CPU) 200 and a pulse width modulation (PWM) controller 300 of the disclosure. In this embodiment, the protocol resolution device 100 is applied to an Intel voltage regulator (VR) 12 platform. The protocol resolution device 100 acts as an interpreter of voltage identification digital (VID) communication protocol and the format(s) between the CPU 200 and the PWM controller 300, and is capable of decoding and monitoring VID communication protocol that is transferred from the CPU 200.

The CPU 200 is in electronic communication with the PWM controller 300 through a serial VID bus, the serial VID bus includes a serial data line SDA and a serial clock line SCL. The data line SDA is capable of transmitting and carrying serial data from the CPU 200 to the PWM controller 300, the clock line SCL is capable of transmitting and carrying a clock signal from the CPU 200 to the PWM controller 300. In this embodiment, the CPU 200 is capable of encoding the VID communication protocol, and conveying the encoded VID communication protocol to the PWM controller 300 through the data line SDA.

The protocol resolution device 100 includes a signal controller 10, a display module 30, and a signal input module 50. In this embodiment, the signal controller 10 is in electronic communication with the display module 30 and the signal input module 50. The signal controller 10 is further electrically connected to the data line SDA and to the clock line SCL, to electrically connect the CPU 200 and the PWM controller 300.

Figure 2:
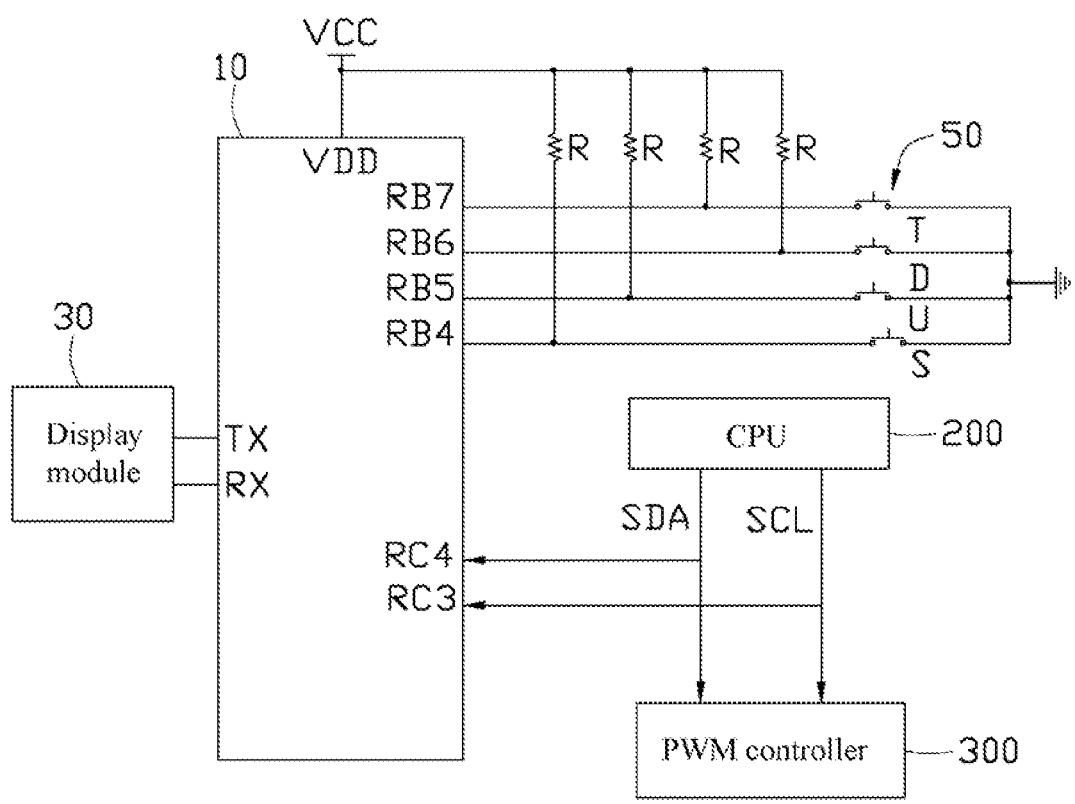
FIG. 2 is a circuit view of the protocol resolution device shown in FIG. 1 of the disclosure.

Further referring to FIG. 2, the signal controller 10 can be a microcontroller unit that contains a processor core, memory, and programmable input/output functions for peripherals. In this embodiment, the signal controller 10 decodes the VID communication protocol from the CPU 200, and stores the decoded VID communication protocol. The signal controller 10 includes a power pin VDD, a clock pin RC3, a data pin RC4, a receiving pin RX, a transmitting pin TX, and four control pins RB4, RB5, RB6 and RB7.

In this embodiment, the power pin VDD is electrically connected to a power source VCC to receive electrical energy to power the signal controller 10. The clock pin RC3 is electrically connected to the clock line SCL, the data pin RC4 is electrically connected to the data line SDA to receive the VID communication protocol from the CPU 200. The signal controller 10 decodes the VID communication protocol to generate a group of identifying messages to identify whether or not the VID communication protocol is correct, and the identifying messages are assigned and stored within a storage device such as a register of the signal controller 10 corresponding to different bit addresses. For example, a first identifying message is assigned to the first bit address of the register, and a second identifying message is accordingly allocated to and stored within the second bit address of the register.

The display module 30 can provide a display of input and output operations. In this embodiment, the display module 30 can be a touch screen or a touch panel, and is electrically connected to the signal controller 10 through the receiving pin RX and the transmitting pin TX. The display module 10 receives the identifying messages from the signal controller 10 through the transmitting pin TX, and displays the received identifying messages to determine whether or not the VID communication protocol is correct.

The signal input module 50 includes a set of keys and can provide a set of input operations. In this embodiment, the signal input module 50 can be a virtual or mechanical keyboard that is capable of providing and inputting instructions to the signal controller 10 to control the signal controller 10 to convey the identifying messages to the display module 30. The signal input module 50 includes a start key S, a page up key U, a page down key D, and stop key T.

In this embodiment, the start key S is electrically connected between ground and the control pin RB4, the page up key U is electrically connected between the control pin RB5 and ground, the page down key D is electrically connected between the control pin RB6 and ground, and the stop key T is electrically connected between ground and the control pin RB7 of the signal controller 10. Each of the control pins RB4, RB5, RB6 and RB7 is electrically connected to the power source VCC through a pull-up resistor R.

When the start key S is operated, the start key S triggers and provides a start command (e.g., an electrical signal) to the signal controller 10, and the signal controller 10 reads and calls up the first identifying message corresponding to the first bit address in the register, and the first identifying message is transmitted and displayed on the display module 30. When the page up key U or the page down key D is operated, the signal input module 50 sends an electrical signal to the signal controller 10, and the identifying messages corresponding to the bit addresses in the register are called up and read from the bottom to the top or from the top to the bottom according to the input operations of the page up key U and the page down key D. When the stop key T is operated, the signal input module 50 triggers and provides a stop command (e.g., an electrical signal) to the signal controller 10, to stop reading and transmitting the VID communication protocol.

Figure 3:
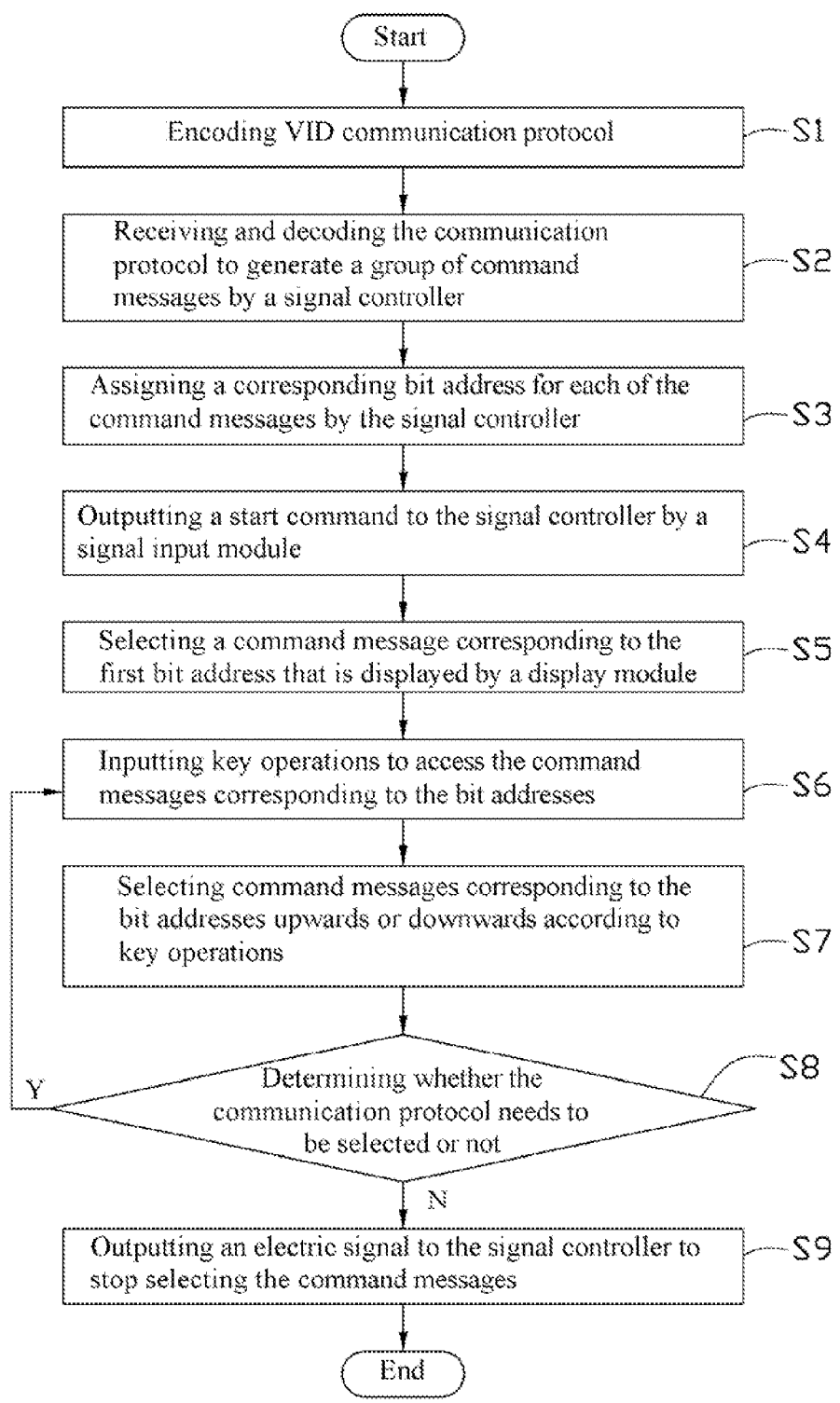
FIG. 3 is a flowchart of a resolution method, according to an embodiment of the disclosure.

Referring to FIG. 3, a protocol resolution method for monitoring the VID communication protocol in real-time according to an embodiment of the disclosure is depicted. The protocol resolution method can use the aforementioned protocol resolution device 100, and may include at least the following steps.

In step S1, the CPU 200 encodes the VID communication protocol, and transmits the encoded VID communication protocol to the PWM controller 300.

In step S2, the signal controller 10 receives the VID communication protocol from the CPU 200 through the data line SDA, and decodes the VID communication protocol into a group of identifying messages.

In step S3, the identifying messages are assigned and stored within the storage device of the signal controller 10, and each identifying message is mapped to correspond to a bit address in the storage device.

In step S4, the signal input module 50 outputs a start command to the signal controller 10 to view the VID communication protocol by operating the start key S.

In step S5, a first identifying message corresponding to the first bit address is called up and selected by the signal controller 10, and is transmitted and displayed on the display module 30.

In step S6, the page up key U or the page dawn key D is operated to select input operations to access the identifying messages corresponding to their respective bit addresses in the storage device.

In step S7, the identifying messages in their respective bit addresses in the storage device are called up and read from the bottom to the top of from the top to the bottom according to the keyed operations of the page up key U or the page down key D, and the identifying messages are transmitted and displayed on the display module 30.

In step S8, the signal controller 10 determines whether or not to continue to select and monitor the VID communication protocol. If all of the VID communication protocols need to be monitored, then the step S6 is repeated. If all of the VID communication protocols do not need to be viewed and monitored, then the method proceeds to step S9.

In step S9, the signal input module 50 outputs a stop command to the signal controller 10 to stop reading the VID communication protocol when the stop key T is operated.

Depending on the embodiment, certain of the steps described may be removed, others may be added, and the sequence of steps may be altered. It is also to be understood that the description and the claims drawn for a method may include some indication in reference to certain steps. However, the indication used is only to be viewed for identification purpose and not as a suggestion as to an order for the steps.

In summary, in the protocol resolution device 100 of the present disclosure, the signal controller 10 decodes the VID communication protocol from the CPU 200, and the signal input module 50 may input different operations into the signal controller 10. The signal controller 10 transmits the decoded VID communication protocol to the display module 30. Thus, the VID communication protocol can be monitored in real-time, to avoid communication abnormalities between the CPU 200 and the PWM controller 300, and any debugging can be rendered more quickly and conveniently.

In the present specification and claims, the word "a" or "an" preceding an element does not exclude the presence of a plurality of such elements. Further, the word "comprising" does not exclude the presence of elements or steps other than those listed.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in the matters of shape, size, and arrangement of parts within the principles of this exemplary disclosure to the full extent indicated by the broad general meaning of the terms in which the appended claims are expressed.

What is claimed is:

1. A protocol resolution device electrically connected to a central processing unit (CPU), the protocol resolution device comprising:
    a signal controller electrically connected to the CPU, and receiving communication protocol from the CPU;
    a signal input module electrically connected to the signal controller and providing an electrical signal to the signal controller; and
    a display module electrically connected to the signal controller, wherein the signal controller decodes the communication protocol from the CPU and stores the decoded communication protocol, the signal controller selectably accesses and calls up the decoded communication protocol according to the electrical signal, and transmits the decoded communication protocol to the display module, and the display module displays the decoded communication protocol.

2. The protocol resolution device as claimed in claim 1, wherein the signal controller is a microcontroller and comprises a power pin, a clock pin, a data pin, a receiving pin, and a transmitting pin, the power pin is electrically connected to a power source to receive electrical energy and power the signal controller, the clock pin is electrically connected to the CPU, the data pin is electrically connected to the CPU to receive the communication protocol from the CPU, and the receiving pin and the transmitting pin are electrically connected to the display module.

3. The protocol resolution device as claimed in claim 2, wherein the signal controller decodes the communication protocol to generate a group of identifying messages, and the identifying messages are assigned and stored within the signal controller corresponding to different bit addresses.

4. The protocol resolution device as claimed in claim 3, wherein the display module is one of a touch screen and touch panel and is electrically connected to the signal controller through the receiving pin and the transmitting pin, the display module receives the identifying messages from the signal controller via the transmitting pin and displays the received identifying messages.

5. The protocol resolution device as claimed in claim 3, wherein the signal input module is a virtual keyboard or mechanical keyboard, and is capable of providing and inputting instructions to the signal controller to control the signal controller to convey the identifying messages to the display module.

6. The protocol resolution device as claimed in claim 5, wherein the signal input module comprises a start key, a page up key, a page down key, and stop key, each of the start key, the page up key, the page down key and the stop key is electrically connected between ground and one of the control pins, and each of the control pins is electrically connected to the power source through a pull-up resistor.

7. The protocol resolution device as claimed in claim 6, wherein when the start key is operated, the start key triggers and provides an electrical signal to the signal controller, and the signal controller reads and calls up a first identifying message corresponding to the first bit address in signal controller, the first identifying message is transmitted and displayed on the display module, when the stop key is operated, the signal input module triggers and provides an electrical signal to the signal controller to stop reading and transmitting the communication protocol.

8. The protocol resolution device as claimed in claim 7, wherein when the page up key or the page down key is operated, the signal input module sends electrical signals to the signal controller, and the identifying messages corresponding to the bit addresses in the signal controller are called up and read from the bottom to the top or from the top to the bottom according to the input operations of the page up key and the page down key.

9. A protocol resolution device comprising:
a signal controller electrically connected to a central processing unit (CPU), and the signal controller receiving communication protocol from the CPU;
a signal input module electrically connected to the signal controller and providing an electrical signal to the signal controller; and
a display module electrically connected to the signal controller, wherein the signal controller decodes the communication protocol from the CPU to generate a group of identifying messages, each of the identifying messages is assigned and stored in the signal controller corresponding to a bit address, the signal input module outputs an electrical signal to the signal controller to selectably accesses and reads the identifying messages corresponding to the bit addresses, and the selected identifying messages are transmitted to the display module to be displayed.

10. The protocol resolution device as claimed in claim 9, wherein the signal controller is a microcontroller and comprises a power pin, a clock pin, a data pin, a receiving pin, and a transmitting pin, the power pin is electrically connected to a power source to receive electrical energy and power the signal controller, the clock pin is electrically connected to the CPU, the data pin is electrically connected to the CPU to receive the communication protocol from the CPU, and the receiving pin and the transmitting pin are electrically connected to the display module.

11. The protocol resolution device as claimed in claim 10, wherein the display module is one of a touch screen and touch panel and is electrically connected to the signal controller through the receiving pin and the transmitting pin, the display module receives the identifying messages from the signal controller via the transmitting pin and displays the received identifying messages.

12. The protocol resolution device as claimed in claim 10, wherein the signal input module is a virtual keyboard or mechanical keyboard, and is capable of providing and inputting instructions to the signal controller to control the signal controller to convey the identifying messages to the display module.

13. The protocol resolution device as claimed in claim 12, wherein the signal input module comprises a start key, a page up key, a page down key, and stop key, each of the start key, the page up key, the page down key and the stop key is electrically connected between ground and one of the control pins, and each of the control pins is electrically connected to the power source through a pull-up resistor.

14. The protocol resolution device as claimed in claim 13, wherein when the start key is operated, the start key triggers and provides an electrical signal to the signal controller, and the signal controller reads and calls up a first identifying message corresponding to the first bit address in signal controller, the first identifying message is transmitted and displayed on the display module, when the stop key is operated, the signal input module triggers and provides an electrical signal to the signal controller to stop reading and transmitting the communication protocol.

15. The protocol resolution device as claimed in claim 14, wherein when the page up key or the page down key is operated, the signal input module sends electrical signals to the signal controller, and the identifying messages corresponding to the bit addresses in the signal controller are called up and read from the bottom to the top or from the top to the bottom according to the operations of the page up key and the page down key.

16. A method for resolving and monitoring communication protocol from a central processing unit (CPU), the method comprising steps of:
receiving and decoding the communication protocol to generate a group of identifying messages by a signal controller;
assigning a corresponding bit address for each of the identifying messages by the signal controller;
providing an electrical signal to the signal controller by a signal input module to select and access the corresponding identifying message; and
transmitting the selected identifying message to a display module from the signal controller.

17. The method as claimed in claim 15, further comprising selecting a first identifying message corresponding to the first bit address of the signal controller.

18. The method as claimed in claim 17, further comprising selecting the other identifying messages corresponding to the bit addresses from the bottom to the top or from the top to the bottom.

19. The method as claimed in claim 17, further comprising determining whether or not the communication protocol needs to be selected.

20. The method as claimed in claim 19, further comprising outputting an electrical signal to the signal controller to stop selecting and reading the identifying messages.

* * * * *